United States Patent
Griffiths

(10) Patent No.: US 12,236,549 B2
(45) Date of Patent: Feb. 25, 2025

(54) AUTOMATED BUCKSHOT MODELING TOOL

(71) Applicant: The Sanborn Map Company, Inc., Colorado Springs, CO (US)

(72) Inventor: Stephen Griffiths, Calgary (CA)

(73) Assignee: THE SANBORN MAP COMPANY, INC., Colorado Springs, CO (US)

( * ) Notice: Subject to any disclaimer, the term of this patent is extended or adjusted under 35 U.S.C. 154(b) by 0 days.

(21) Appl. No.: 18/057,961

(22) Filed: Nov. 22, 2022

(65) Prior Publication Data

US 2023/0162460 A1 May 25, 2023

Related U.S. Application Data

(60) Provisional application No. 63/281,961, filed on Nov. 22, 2021.

(51) Int. Cl.
| | |
|---|---|
| *G06T 19/20* | (2011.01) |
| *G06F 18/2413* | (2023.01) |
| *G06T 5/70* | (2024.01) |
| *G06T 7/00* | (2017.01) |

(52) U.S. Cl.
CPC ........ *G06T 19/20* (2013.01); *G06F 18/24147* (2023.01); *G06T 5/70* (2024.01); *G06T 7/0002* (2013.01); *G06T 2207/10028* (2013.01); *G06T 2207/30168* (2013.01); *G06T 2210/56* (2013.01)

(58) Field of Classification Search
CPC ......... G06T 19/20; G06T 5/70; G06T 7/0002; G06T 2207/10028; G06T 2207/30168; G06T 2210/56; G06F 18/24147
See application file for complete search history.

(56) References Cited

U.S. PATENT DOCUMENTS

2013/0202197 A1* 8/2013 Reeler ................. G06T 7/20
382/154

OTHER PUBLICATIONS

Regaya, Y., Fadli, F. & Amira, A. Point-Denoise: Unsupervised outlier detection for 3D point clouds enhancement. Multimed Tools Appl 80, 28161-28177 (2021). https://doi.org/10.1007/s11042-021-10924-x. (Year: 2021).*

* cited by examiner

*Primary Examiner* — William A Beutel
(74) *Attorney, Agent, or Firm* — Brownstein Hyatt Farber Schreck, LLP

(57) ABSTRACT

The invention relates to a new approach to characterize, model, and find Buckshot anomalies within LiDAR point cloud dataset collected with Geiger-mode Avalanche Photodiode (GmAPD) LiDAR platforms.

13 Claims, 13 Drawing Sheets

AUTOMATED BUCKSHOT MODELING TOOL

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

Trademarks used in the disclosure of the invention and the applicants make no claim to any trademarks referenced.

CROSS-REFERENCE TO RELATED APPLICATIONS

This application claims priority to U.S. Provisional patent Application Ser. No. 63/281,961, filed on Nov. 22, 2021, which is incorporated by reference herein in its' entirety.

BACKGROUND OF THE INVENTION

1) Field of the Invention

The invention relates to an innovative approach to characterize, model, and find Buckshot anomalies within LiDAR point cloud dataset collected with Geiger-mode Avalanche Photodiode (GmAPD) LiDAR platforms.

2) Description of Related Art

The current prior art utilizes LiDAR to collect data of the Earth's surface and using that information, produce new equipment, techniques, algorithms for the data utilization, mapping industries, visualization and modeling systems. The data is used to create representations that are known as Digital Elevation Models or DEMs. A common method is to use LiDAR point cloud data collected with Geiger-mode Avalanche Photodiode (GmAPD) LiDAR platforms. The point cloud is the first data product of any LiDAR instrument. In its crudest form, it is just a collection of range measurements and sensor orientation parameters. After an initial processing of the range and orientation data for each LASER shot, the next phase is to convert the data into a position in a 3D frame of reference and this spatially coherent cloud of points is the base for further processing and analysis. In addition to the spatial information, some LiDAR systems provide for each point information with regards to texture or color information. This data can be derived from the intensity of the reflected laser signal or from a co-registered imaging sensor. The combination of 3D spatial and spectral information contained in the data set allows great flexibility to perform manipulations to extract the required information.

Typical operations performed on a LiDAR point cloud dataset include visualization, segmentation, classification, filtering, transformations, gridding and mathematical operations. However, all systems experience the problem of how to handle abnormalities within LiDAR point cloud dataset collected. Leaving abnormalities which are commonly referred to as Buckshot in the point clouds data set makes the data harder to classify and open to misclassification. The common method to eliminate Buckshot abnormality identification is by using GIS technicians to manually sort the data using visual techniques. This is a very labor-intensive task and is prone to error in interpretation and omission.

Therefore, what is needed in the art is an automated approach that removes these issues and makes the process more efficient by eliminating the amount of time required to remove this noise/Buckshot abnormalities manually prior to classification, ultimately making the finished product more affordable.

BRIEF SUMMARY OF THE INVENTION

The invention in one form is directed to generating a digital representation of the Earth's surface that may be used later within a computer system for visualization or modeling purposes.

The invention in another form uses Geiger-mode Avalanche Photodiode (GmAPD) LiDAR platforms that are capable of delivering United States Geological Survey (USGS) 3D Elevation Program Quality Level 1 (USGS 3DEP QL1) specifications and at point densities that are 50 points per square meter or higher.

In yet another form, the instant invention uses the LiDAR point cloud dataset and determines abnormalities in the data and applies a corrective algorithm to remove all abnormalities in the data also referred to as Buckshot events such as extraneous noise points from the LiDAR point cloud dataset.

An advantage of the present invention is that the algorithm of the instant invention is a machine-driven algorithm that uses machine learning/artificial intelligence which eliminates costly operator-based interpretation methods to eliminate the extraneous noise points from the LiDAR point cloud dataset.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION

Figure 1:
FIG. 1 shows a typical example of Buckshot in an optical image where it would be more commonly known as glint or glare in this case caused by sunlight.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art; however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this application the use of the singular includes the plural unless specifically stated otherwise and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure be considered as an example of the principles of the invention and not intended to limit the invention to the specific embodiments shown and described.

The terms point cloud, LiDAR dataset, LiDAR data, point cloud data are used interchangeably and are meant to mean a LiDAR point cloud dataset which are retrieved or stored in a tile.

The term tile is used to refer to a section of topography. Tiles are arranged in a grid pattern, aligned to the UTM co-ordinate system and are either 2 km×2 km or 500 m by 500 m squares.

The terms abnormalities in the data, Buckshot events, and extraneous noise points are used interchangeably to mean abnormalities in the data in LiDAR point cloud dataset.

The terms user, technician, individual, and operator are used interchangeably to mean an individual who uses the data or the system.

The term range walk refers to the phenomenon where a laser that is used to measure distance by measuring the pulse-return time of arrival based on the transition of the pulse return's rising edge through a detection threshold are subject to systematic range error. This range error is referred to as range walk and is caused by variations in pulse-return amplitude.

The term multi scale machine learning method can be viewed as where the algorithm which is used to evaluate a dataset is viewed and analyzed at different scales. This is becoming more commonplace in machine learning recently and is proving to be a valuable tool when analyzing a complex dataset. At their core, multiscale methods capture the local geometry of neighborhoods defined by a series of distances between points or sets of nearest neighbors. This is a bit like viewing a part of a slide through a series of microscope resolutions. At high resolutions, very small features are captured in a small space within the sample. At lower resolutions, more of the slide is visible, and a person can investigate bigger features. Main advantages of multiscale methods include improved performance relative to state-of-the-art methods and dramatic reductions in necessary sample size to achieve these results.

The term UTM is the acronym for Universal Transverse Mercator, a plane coordinate grid system named for the map projection on which it is based (Transverse Mercator). The UTM system consists of 60 zones, each 6-degrees of longitude in width.

The term Multiscale curvature classification (MCC) is an iterative multiscale algorithm for classifying LiDAR returns that exceed positive surface curvature thresholds, resulting in all the LiDAR measurements being classified as ground or nonground. The MCC algorithm yields a solution of classified returns that support bare-earth surface interpolation at a resolution commensurate with the sampling frequency of the LiDAR survey.

As used in this disclosure, a power law is a functional relationship between two quantities, where a relative change in one quantity results in a proportional relative change in the other quantity, independent of the initial size of those quantities: one quantity varies as a power of another.

The instant invention uses the LiDAR point cloud dataset, which is the foundational data for 3D Elevation Program (3DEP) in the conterminous United States and contains the original three-dimensional information from which the Digital Elevation Model (DEMs) products are derived. Most of the data collected in 2014 and later, meet what is referred to as 3DEP specifications for quality level 2 nominal pulse spacing and vertical accuracy. Data collected prior to 2014, often does not meet the quality level 2 specification. QL2 and QL1 LiDAR data ensures that point data and derivative products are suitable for 3DEP and the standard national DEMs. Data nominal pulse spacing is provided in the LiDAR point cloud dataset status graphics. When using the point cloud dataset, data qualities such as vertical accuracy must be examined to determine if the data meets particular 3DEP quality level specifications.

Source resolution DEMs data are the original bare earth DEMs derived from LiDAR point cloud dataset source. Source DEMs processed by the USGS after January 2015 are provided where the original DEMs horizontal resolution or projection differ from the 3DEP standard DEMs datasets.

All the input and display fields shown in the detail description of the invention are optional and some embodiments may use all or only some of the input fields.

The prior art does not provide for a system that provides a system for automatic elimination of abnormalities in the data such as Buckshot events, extraneous noise points in the data in LiDAR point cloud dataset. The prior art includes U.S. Pat. No. 10,823,825 issue date 11/3/2020, U.S. Patent Application 20080105045, Publication Date: May 8, 2008; U.S. Patent Application 20150378023, Publication Date: Dec. 31, 2015; U.S. Patent Application 20200035030, Publication Date: Jan. 30, 2020 the contents of which are incorporated by reference in their entirety.

The instant invention discloses an automated approach to characterize, model, and find Buckshot anomalies within LiDAR point cloud dataset collected with Geiger-mode Avalanche Photodiode (GmAPD) LiDAR platforms. These Buckshot events are anomalous because they do not represent measurements of any physical target and are therefore considered noise within the data. Without removing the Buckshot noise events, the LiDAR point cloud dataset are less interpretable and far harder to segment into classification categories. LiDAR classification is the dividing of the LiDAR point cloud dataset into pre-determined categories such as building, vegetation, water, etc. The task of LiDAR classification is quite common and increase the value to the data. Leaving Buckshot in the point cloud dataset makes the data harder to classify and open to misclassification. Up to this point Buckshot identification has been done manually by GIS technicians using visual techniques. This is a very labor-intensive task and is prone to error in interpretation and omission. Having an automated approach removes issues associated with manual and human error and makes the process more efficient by eliminating the amount of time required to remove this noise prior to classification and or utilization, ultimately making the finished product more affordable.

There are many ways to generate a digital representation of the Earth's surface that may be used later within computer systems for visualization or modeling purposes. These representations are known as Digital Elevation Models or DEMs and they can be generated using many different approaches. These approaches predominantly differ in accuracy and price—generally, the better the accuracy the higher the price. The use of DEMs is becoming more valuable especially as modeling software and analytics are evolving. Some common uses include 3D flight simulations, line of sight analysis, precision farming, forestry management, creation of relief maps, flood modeling, water flow modeling, infrastructure design, intelligent transportation systems design, smart city design, and many more applications There are basically three technologies used today to generate DEMs. These are:
1) Stereographic—uses 2 images (usually either optical or radar images) that overlap to form a stereo impression of an area of interest.
2) Interferometric—uses 2 radar images and measures the phase difference between the images to derive the DEMs.
3) LiDAR—Light Detection and Ranging where a laser is used to measure the distance between the sensor and the ground to build the DEMs.

All three of these approaches can be based on airborne or satellite platforms. Of all these methods, airborne LiDAR is typically the highest accuracy. Satellite based stereo (using radar images) is the least accurate, while Interferometric products lie somewhere in-between.

The instant invention preferred method of capturing the data is to use Geiger-mode Avalanche Photodiode (GmAPD) LiDAR platforms. The Geiger Mode LiDAR (GML) units have evolved to a fully operational platform capable of delivering data which is consistent with United States Geological Survey (USGS) 3D Elevation Program (3DEP) Quality Level 1 (QL1) specifications, and at point densities that are 50 points per square meter or higher.

There are a number of items that differentiate the instant invention GML from the conventional Linear Mode LiDAR (LML). First, the GML uses an extremely sensitive sensor. This means the platform can fly higher and faster than typical LML's. Secondly, the sensor is an array mode camera made up of 32 by 128 elements, while the typical LML units only have a single sensor element.

All LiDAR units work in basically the same way. First a laser pulses a beam of light towards a mirror, the mirror reflects this pulse towards the ground, the pulse of light travels to the ground, strikes it and is reflected back towards to sensor, finally the sensor records the returned light beam intensity along with some other information such as timing, position of the plane, etc. Post flight, all the recorded information is processed using sophisticated calculations for LiDAR data allowing one to recover the position on the ground for each pulse transmitted from the laser and recorded by the sensor. Global Positioning System (GPS) and inertial measurement unit (IMU) data are recorded for position and attitude information used in the LiDAR equation. The only difference between the GML and LML is that the GML system records (32×128) 4096 samples for each pulse rather than just one (in the case of the LML unit.) This single difference provides an advantage for the GML data when compared to the LML data in that it allows the GML to fly higher and faster while at the same time collecting 50 points per square meter, or more. Typical LML point densities are around 8 to 12 points per square meter based on measurement density. Typical readings from the LiDAR devices are made in measurements per square meter usually addressed as measurements per second per meter squared to just a few measurements per meter squared after the data has gone through processing.

From time to time there can be a problem with the collection geometry and the GML array sensor. If the laser beam strikes a particularly strong reflector, then a strong return signal enters the sensor array and may potentially saturate the array. Accompanying this potential saturation effect, there can also be random stray photons "bouncing" around the inside of the camera/instrument before finally being absorbed by the sensor. The manifestation of this strong reflector problem has been termed "Buckshot."

Figure 13:
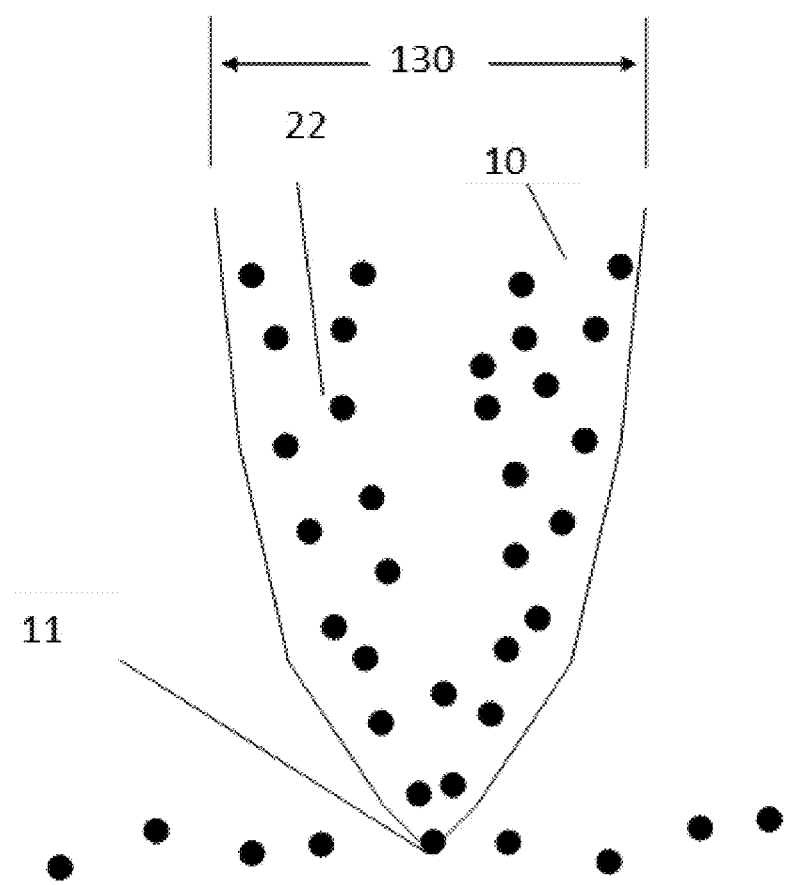
FIG. 13 shows a cross sectional view of a theoretical cone of a Buckshot and the size reference.

Referring now to the drawings, and more particularly to FIG. 1, there is shown a visual example of a buckshot event. This is a typical example of Buckshot event 10 being a reflection off of window 15 in an optical image where it would be more commonly known as glint or glare in this case caused by sunlight. FIG. 13 shows a cross section view of a theoretical cone of a Buckshot and the size reference. As one can see FIG. 13 shows a typical cross section of a theoretical cone of a Buckshot with high intensity point 11 which is shown at the approximate center of the Buckshot event 10. The buckshot points 22 form the high intensity point mass. And the dimension 130 refers to radius size Buckshot which is typically classified as a 2-meter radius size Buckshot, a 4-meter radius size Buckshot or an 8-meter radius size Buckshot.

Figure 2:
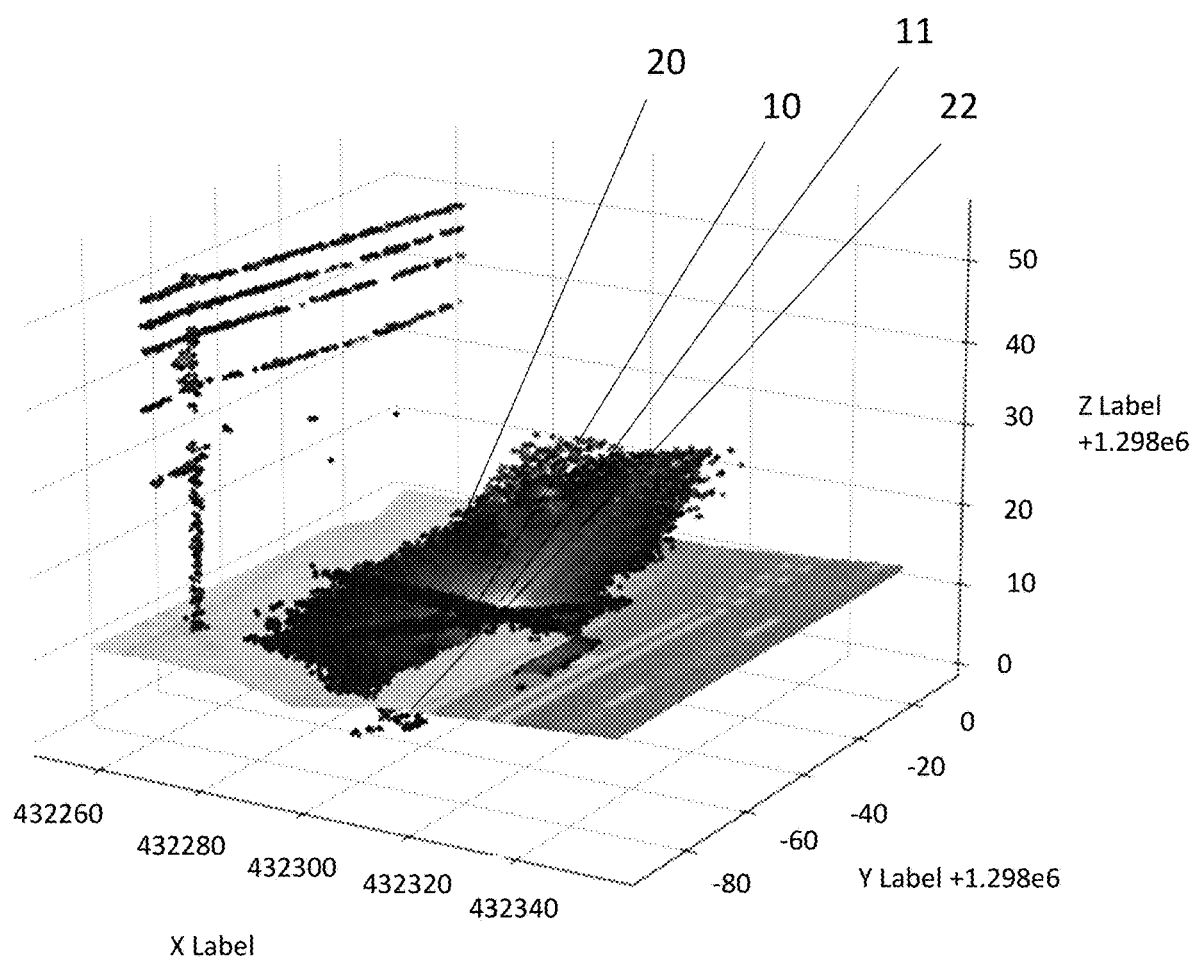
FIG. 2 shows a first typical example of Buckshot in LiDAR point cloud dataset.

Referring now to FIG. 2 there is shown a graphical representation of data from the LiDAR point cloud dataset showing a typical Buckshot event. This data set has a point density of 30 points per square meter. The Buckshot event 10 is shown in the center of the point cloud dataset 20 as the dark points. The high intensity point 11 is shown at the approximate center of the Buckshot event 10. One is directed to the inverted cone shape and that there is otherwise good ground point data under the Buckshot event. Also, as one can see from the graph some Buckshot points 22 occur below ground. The buckshot points 22 form the high intensity point mass.

Figure 3:
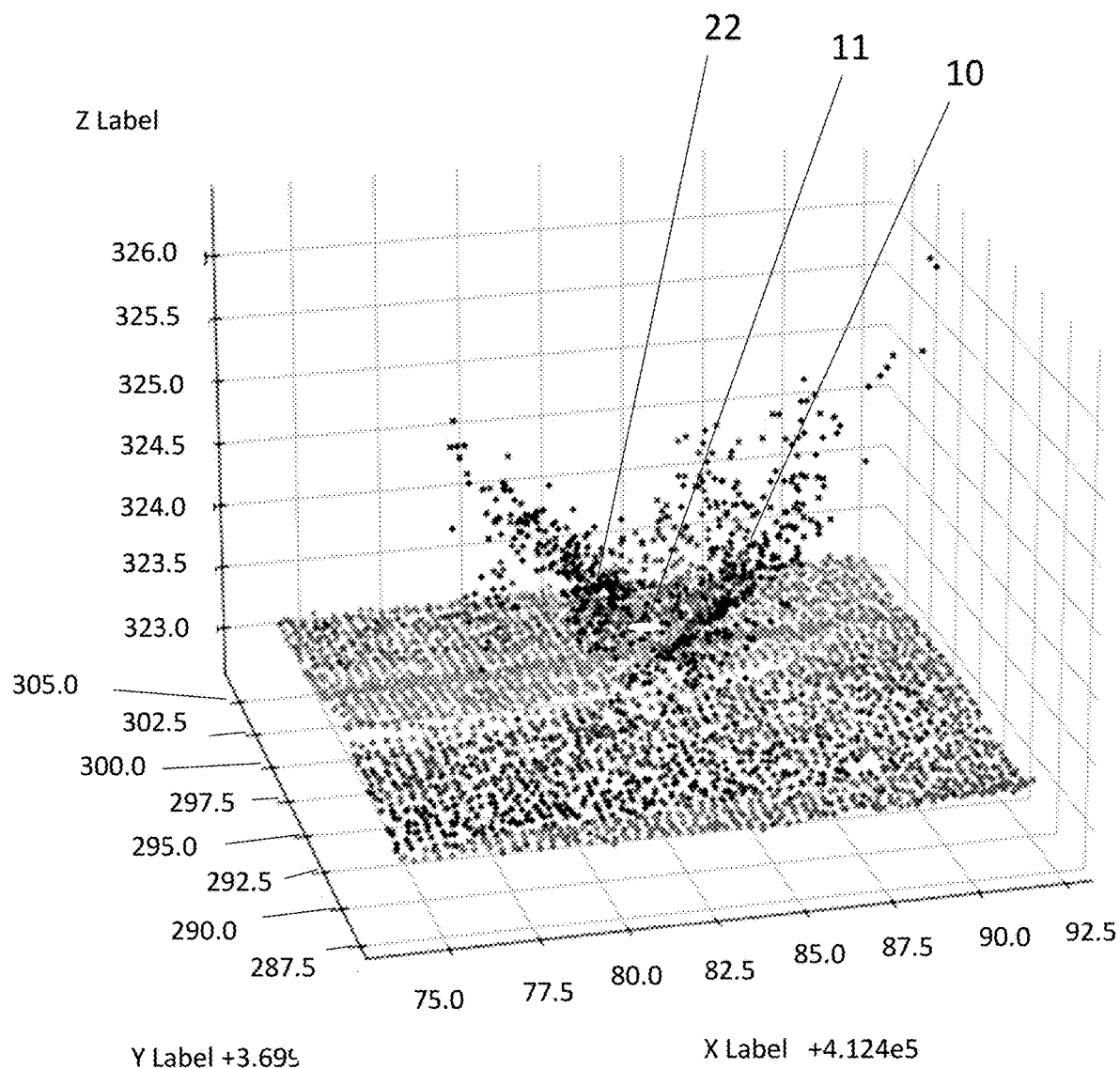
FIG. 3 shows second typical example of Buckshot in LiDAR point cloud dataset.

Referring now to FIG. 3 there is shown a graphical representation of data from the LiDAR point cloud dataset showing a typical Buckshot event 10. This data set has a point density of 8 points per square meter. The buckshot points 22 form the high intensity point mass and the high intensity point 11 is shown at the approximate center of the Buckshot event 10.

One can see the difference between the data displayed in FIG. 2 and FIG. 3. Both show typical examples of Buckshot found in two LiDAR point cloud dataset: one with a point density of 30 points per square meter and the another with a point density of 8 points per square meter. One can notice that in both cases the spray of points emanating away from the ground in an inverted cone shape. This collection of points forms a single Buckshot event; an event that does not represent a measurement of the ground or other physical objects such as power poles and power lines. Other points in the point cloud dataset do represent measurements on the ground or physical targets. Because a Buckshot event does not represent a measurement of a physical target, these Buckshot points are anomalous to the LiDAR point cloud dataset. In other words, they are "noise" events and disrupt the interpretability of the data. For this reason, it is desirable to remove all Buckshot events from the LiDAR point cloud dataset, i.e., the extraneous noise points, from the LiDAR point cloud dataset.

It has been found that Buckshot events occur across a range of size scales. For this reason, the instant invention characterized them into 3 basic groups:
1. 2-meter radius size Buckshot.
2. 4-meter radius size Buckshot.
3. 8-meter radius size Buckshot.

The instant invention then uses the three basic groups concept, to define Buckshot to be multi-scale. Typical Buckshot abnormality in the point cloud dataset size involves an area less than 8 to 10 meters radius. However, larger radius abnormalities are possible. The approach to finding and removing Buckshot is extendable to larger scales if necessary.

The instant invention uses six key characteristics to define a Buckshot event. These are:
1. A Buckshot event is radial. That is, they are symmetrical about the center. The Buckshot looks like inverted cones sitting on top of otherwise valid point cloud dataset. This can be seen visually in FIG. 2, FIG. 3 and FIG. 13.
2. The centroids of the buckshot data are vertically displaced from the surrounding data. As noted, a Buckshot event is caused by a high reflectance object, and this leads to a saturation within the sensor. This saturation, in turn, leads to a range walk, and this range walk causes the Buckshot to be displaced vertically from the ground points within the LiDAR point cloud dataset. Range walk occurs when saturated signal is broader than usual. This wider signal trips the sensor sooner than normal and therefore the time to target is recorded sooner. The effect of all this is a vertical displacement as seen visually when the data is plot as shown in LiDAR data plots FIG. 2 and FIG. 3.
3. The instant invention captures good data on the same footprint as Buckshot data. Even though there is a Buckshot event the data set in most cases contains good data under the Buckshot event.
4. Buckshot events have a central peak brightness in the intensity dimension which is usually in the top few percentage points of the overall intensity curve. In other words, when viewing the data as intensity, the central core of each Buckshot event is very bright.
5. The intensity follows a power curve drop-off that is radially symmetrical about the center. The instant invention refers to this phenomenon as the Intensity Radial Power Drop-off.
6. The power curve relationship is multiscale in nature. The instant invention uses a power curve for the 2-meter radius size Buckshot, the 4-meter radius size Buckshot, and the 8-meter radius size Buckshot. The instant invention is capable of generating other power curves for different size Buckshot events if needed or the power curve can be inputted into the system by an operator.

The instant invention approach is to model Buckshot events found in LiDAR point cloud dataset. First, it evaluates the Intensity Radial Power Drop-off characteristic. The instant invention plots intensity as a function of radial distance from the center of a Buckshot (Radial Power Drop-off characteristic) event which displays a power law relationship. There is a power law relationship between these two parameters intensity and radial distance from the center for the Buckshot event.

Figure 4:
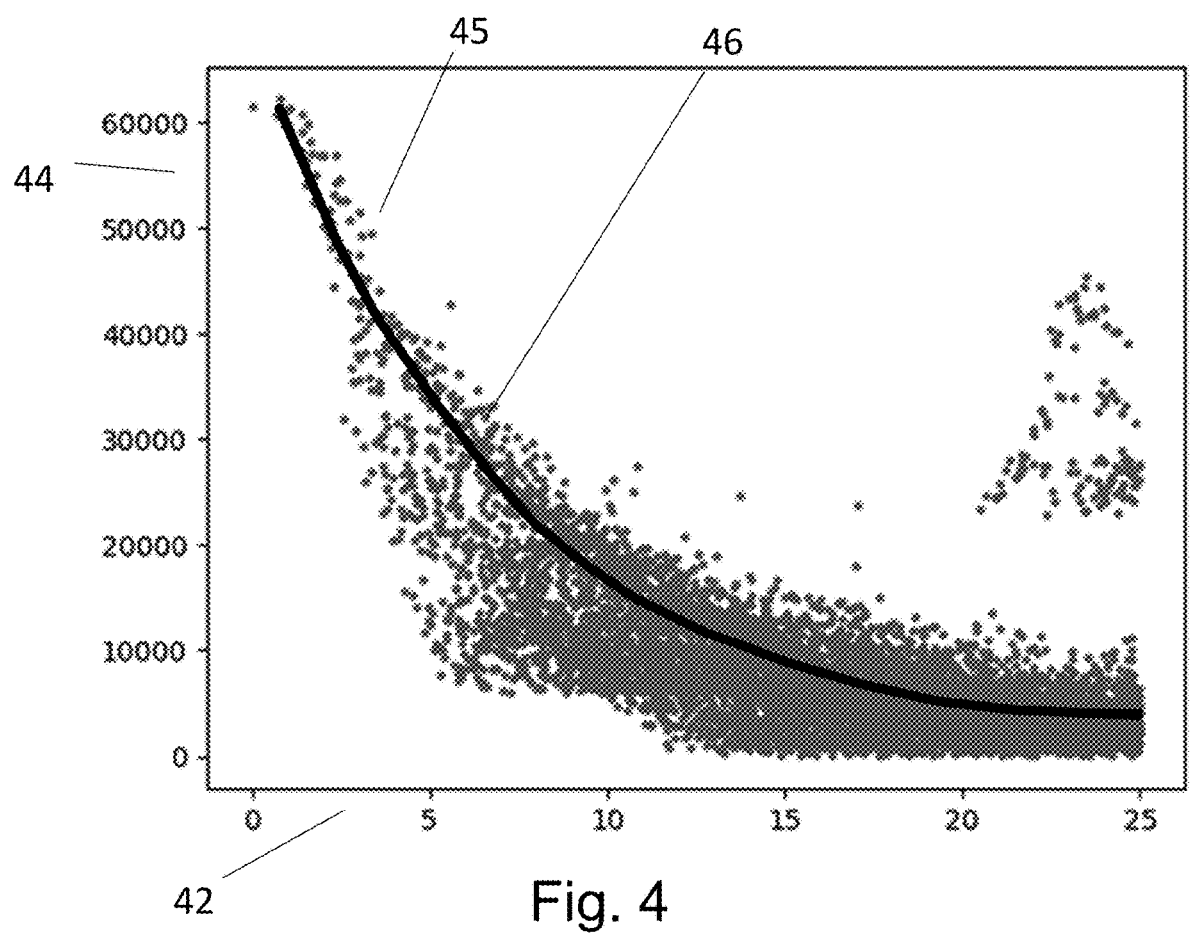
FIG. 4 shows intensity Radial Power Drop-off relationship example for a typical Buckshot event.

Referring to FIG. 4 which shows an example of the power law relationship. In the FIG. 4 a typical Buckshot event has been plotted with the horizontal distance from the center along the X axis 42, and the LiDAR intensity for the points along the Y axis 44. As can be seen, there is a distinct drop in Intensity values 45 as one moves away from the Buckshot center. This relationship is not linear or exponential but is instead a power law function shown by line 46. The instant invention has generated the plot for numerous 8-meter Buckshot events and the results is that 8-meter events typically have the same shape and can in most cases be parameterized with the same Intensity Radial Power Drop-off relationship. Likewise, there is a similar relationship for the 4-meter Buckshot events and the 2-meter Buckshot events. The only difference is that there is a different set of parameter values. The similarities found in the Buckshot events allows the instant invention to use an automated approach to Buckshot correction algorithm such that the tool is multiscale. The approach is easily extended to find solutions for 1, 3, 5, and 6-meter radius cases and is applicable to larger radius abnormalities in the data. However, in practice, all these additional cases are unnecessary because the three cases 2-meter radius, 4-meter radius and 8-meter radius size Buckshot events cover virtually all known events observed.

Using these identified Buckshot events, the instant invention uses a machine learning program to generate the best fit parameters for each of the 2-meter, 4-meter, and 8-meter Buckshot events. The machine learning module can receive input either from the automated system or through manual entry of Buckshot events and the machine learning program uses this new information to generate best fit parameters for each scale so that the algorithm will continue to improve.

Table 1 below shows the results of fitting a third order polynomial to a set of manually identified 25 feet (8 meter) Buckshot events. In the table the columns show the number of points in each Buckshot event, the goodness of fit (or the R-squared of the fit), and the resulting parameters of the fit. As commonly understood R-squared is a statistical measure of how close the data are to the fitted regression line. It is also known as the coefficient of determination, or the coefficient of multiple determination for multiple regression. The definition of R-squared is the percentage of the response variable variation that is explained by a linear model. Or:

R-squared=Explained variation/Total variation.

R-squared is always between 0 and 100%.

0% indicates that the model explains none of the variability of the response data around its mean.

A value of a 100% indicates that the model explains all the variability of the response data around its mean.

In general, the higher the R-squared, the better the model fits your data.

In the instant invention the parameters are the Y intercept and the 3 coefficients. The table then shows the average of these seven events, and then the weighted average (based on R-squared), and finally the standard deviation of the individual parameters.

TABLE 1

25 ft Buckshot table showing results of 7 individual events and the weighted average of the parameters of the fit.

| N Points | R^2 | Intercept | Coeff 1 | Coeff 2 | Coeff 3 |
|---|---|---|---|---|---|
| 5953 | 0.779 | 57990.733 | −7183.248 | 330.560 | −5.260 |
| 5685 | 0.803 | 62767.827 | −8147.147 | 387.841 | −6.325 |
| 8657 | 0.682 | 57004.554 | −6727.247 | 316.213 | −5.314 |
| 5877 | 0.409 | 59852.335 | −8454.280 | 450.537 | −8.042 |
| 5323 | 0.712 | 61227.386 | −8236.267 | 405.703 | −6.778 |
| 4077 | 0.685 | 58319.910 | −8439.071 | 427.683 | −7.136 |
| 5087 | 0.663 | 62465.790 | −8641.667 | 436.575 | −7.483 |
| | Average: | 59946.934 | −7975.561 | 393.587 | −6.620 |
| | Weighted Average: | 59946.994 | −7975.670 | 385.696 | −6.500 |
| | Std Dev: | 2276.039 | 726.999 | 52.270 | 1.057 |

Using this same approach, a similar table is constructed for a set of manually identified 2-meter Buckshot and a set of 4-meter Buckshot. The result is to have a multi scale set of Intensity Radial Power Drop-off parameterizations for the multi-scale Buckshot events. The weighted average result for each Buckshot scale is the trained Intensity Radial Power Drop-off model.

Figure 5:
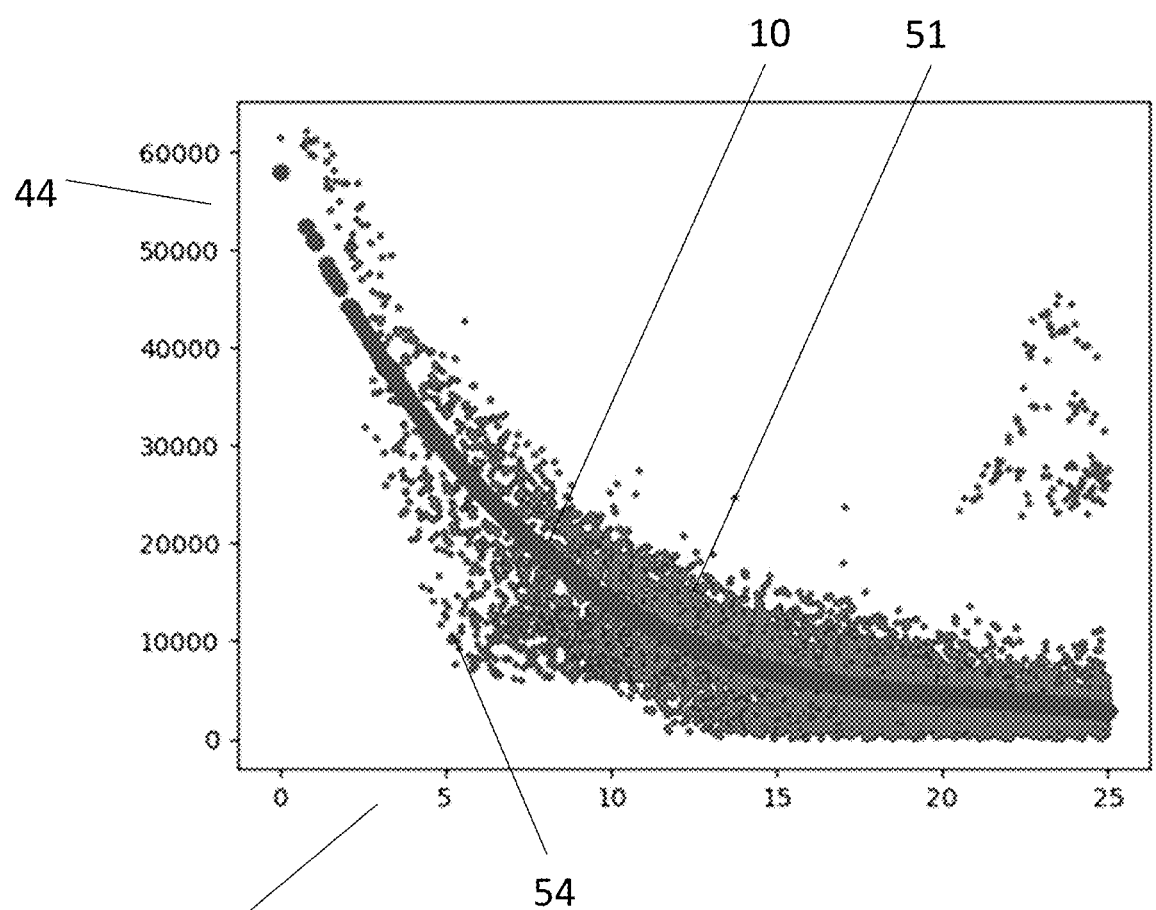
FIG. 5 shows weight average 3rd order power curve for 25 ft Buckshot event shown in magenta.

Referring now to FIG. 5 is shown a graph of Weight average 3rd order power curve for 25 ft Buckshot 10 event shown in dark grey. In the FIG. 5 a typical Buckshot event has been plotted with the horizontal distance from the center along the X axis 42, and the LiDAR intensity for the points along the Y axis 44. The points 51 are points belonging to the Buckshot. Points 54 are points on the ground, and do not belong to the Buckshot event.

Figure 6:
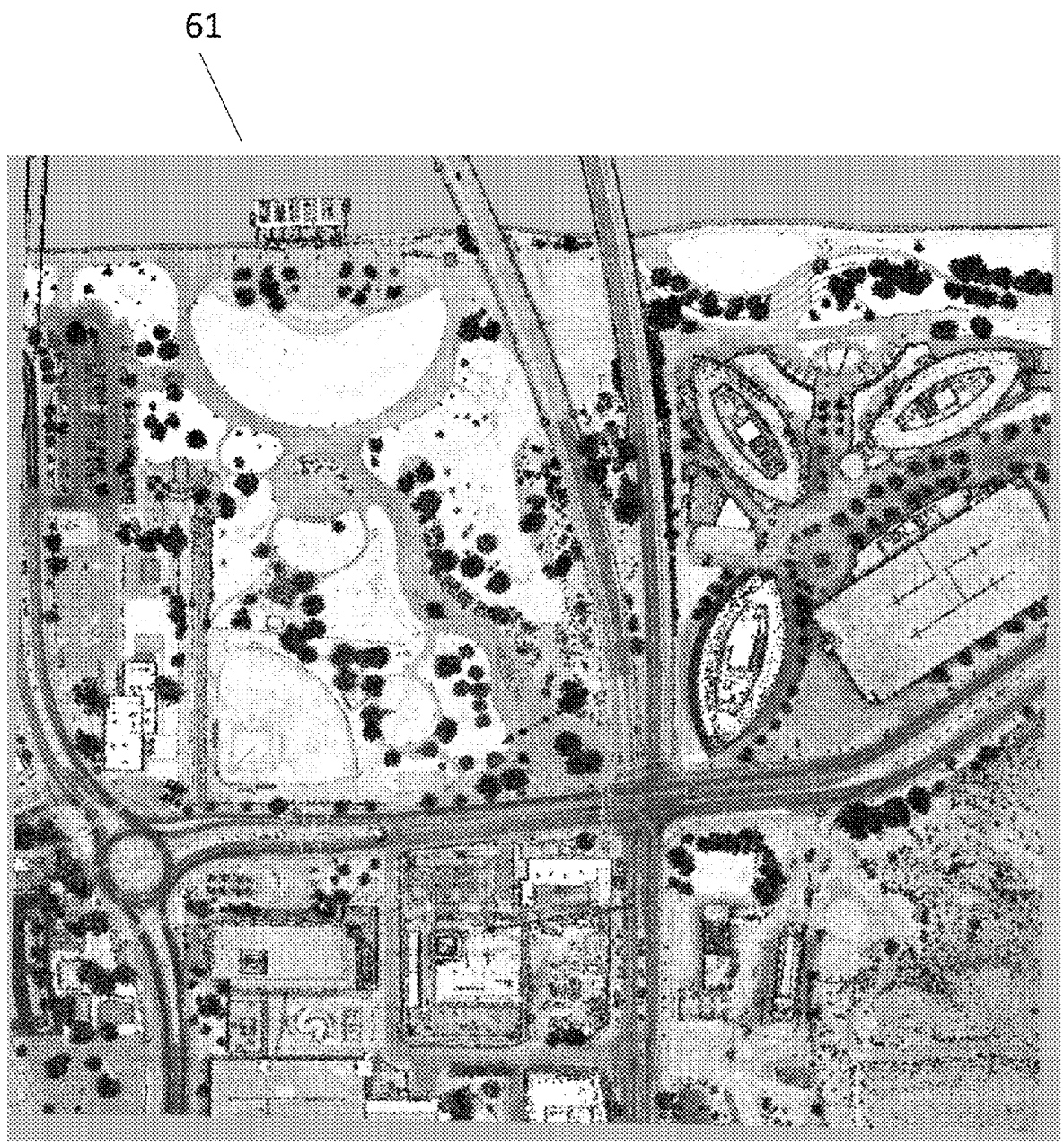
FIG. 6 shows a LiDAR point cloud dataset in a 500 meter by 500 meter tile rendered as intensity.

A critical part of the instant invention is how to find Buckshot Events in a LiDAR point cloud dataset. Once you know what Buckshot looks like, the question becomes how do we find them in LiDAR point cloud dataset? Usually, LiDAR point cloud dataset are presented in tiles to ensure that the data are manageable. The tiles are arranged in a grid pattern, aligned to the UTM co-ordinate system. Tiles can be any size, but one commonly found size may be 500 meters (m) in the longitude direction and 500 meters in the latitude direction. FIG. 6 shows a typical LiDAR data set for a 500 meter by 500 meter tile 61, displaying the points as intensity.

Looking at this data it is not obvious where, or if, there are any Buckshot events in this data set.

Figure 7:
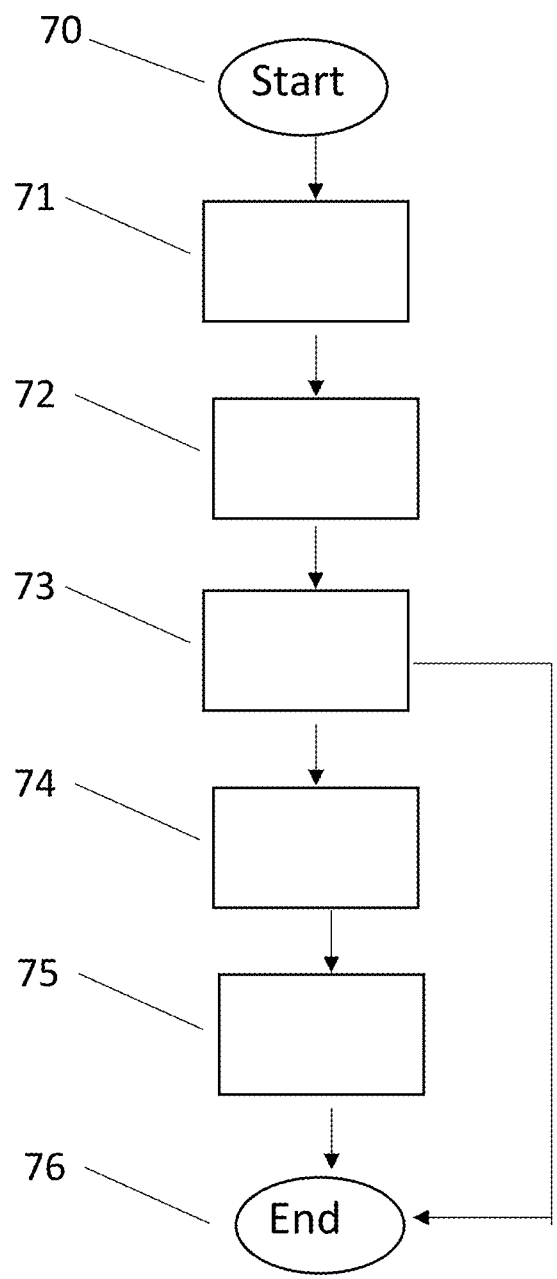
FIG. 7 shows a flowchart of the instant invention algorithm to find Buckshot events given a set of input LiDAR point cloud dataset tiles.

The instant invention has an algorithm to find Buckshot events given a set of input LiDAR point cloud tiles. The algorithm is shown in FIG. 7 and follows the following basic outline:

1) Step 70: Start the algorithm
2) Step 71: Isolate all high Intensity LiDAR points as potential Buckshot centroids.
3) Step 72: For each of these centroids collect its nearest neighbors (within the size of the Buckshot we are considering). That means for an 8-meter buck shot the algorithm would consider data points up to 8 meter radius away from the center of the buckshot. The algorithm does the same for the 2-meter radius and 4-meter radius buckshot analysis.
4) Step 73: given this cluster of points do they follow the trained Intensity Radial Power Drop-off model? If yes then go to step 4 else Go to step 76.
5) Step 74: then the algorithm makes sure the centroid is not on the ground.
6) Step 75: If the centroid is not on the ground, then the data is a Buckshot event.
7) Step 76: End The instant invention has to determine if a potential Buckshot centroid is on the Ground which is important to verifying that the data is a Buckshot event.

The second characterization of the algorithm is for the instant invention to collect the nearest neighbor points to the centroids of Buckshot events. Then the instant invention identifies that these events are vertically offset from the ground. This means all Buckshot centroids do not sit on the ground but appear hover over the ground. Using this information, the instant invention can distinguish between ordinary bright objects in an intensity image and real Buckshot events. To do this the instant invention utilizes an approach called Multi-scale Curvature Classification (MCC) to establish if a potential Buckshot centroid is on the ground or not. Specifically, MCC is an iterative multiscale algorithm for classifying LiDAR returns that exceed positive surface curvature thresholds, resulting in all the LiDAR measurements being classified as ground or nonground.

Figure 8:
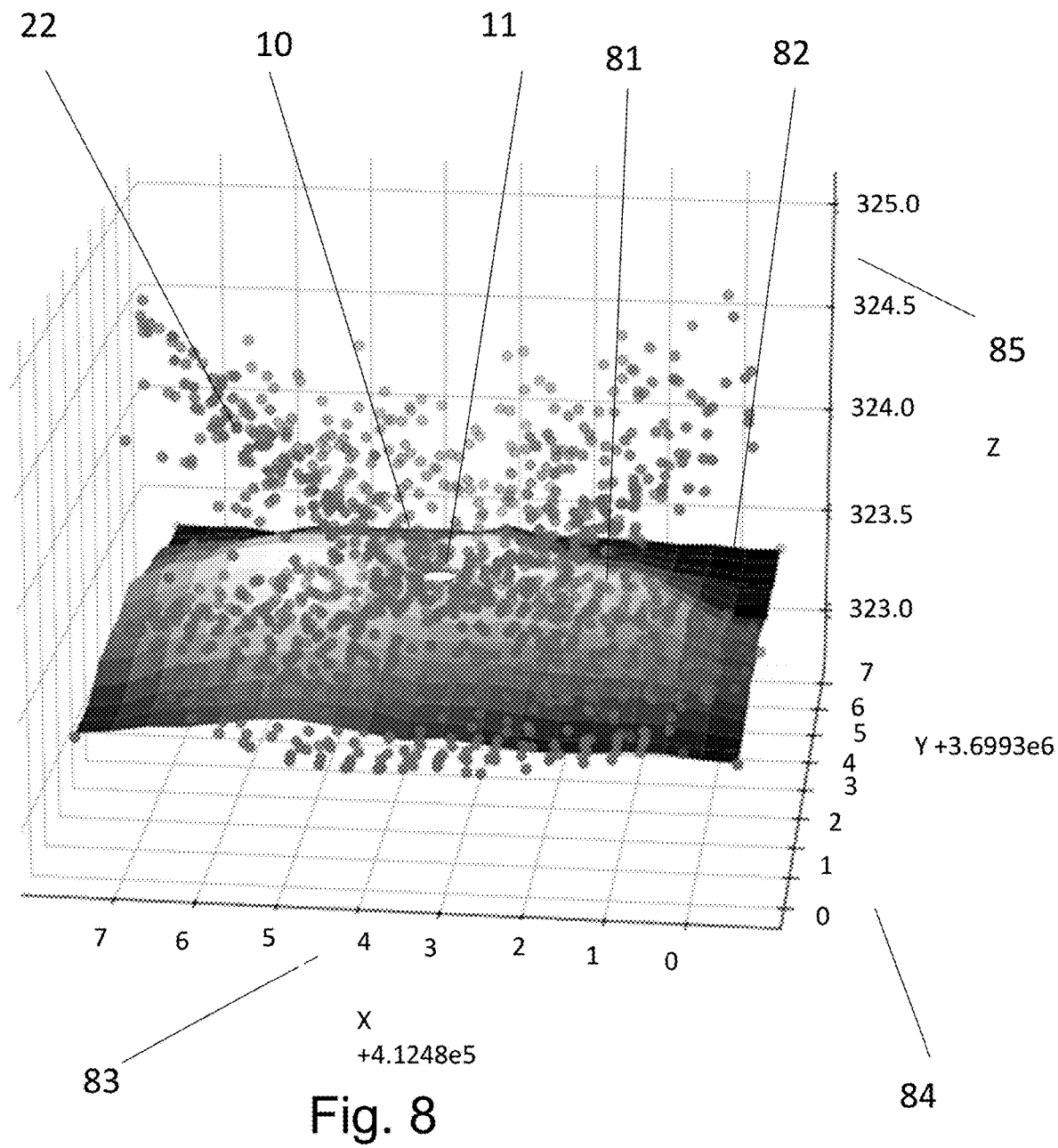
FIG. 8 shows a Multi-scale Curvature Classification surface fitting illustrated for a Buckshot event.

The MCC approach is iterative and it fits many surfaces to data each time filtering the data set before fitting a new surface. The surface fitting algorithm used is called Thin-Plate Spline. As each surface is fit to the data, all points that lie beyond a threshold above that surface are removed before the next surface is fit. Surfaces are fit until the change is small and the algorithm has reached convergence. FIG. 8 shows a MCC surface fitting illustrated for a Buckshot event 10. Here the Buckshot points 81 are the thin-plate spline surface is shown fitting the ground data 82 and ignoring the spray of the Buckshot. Element 83 is the X axis, element 84 is the Y axis and element 85 is the z axis. The buckshot points 22 form the high intensity point mass and the high intensity point 11 is shown at the approximate center of the Buckshot event 10.

Figure 9:
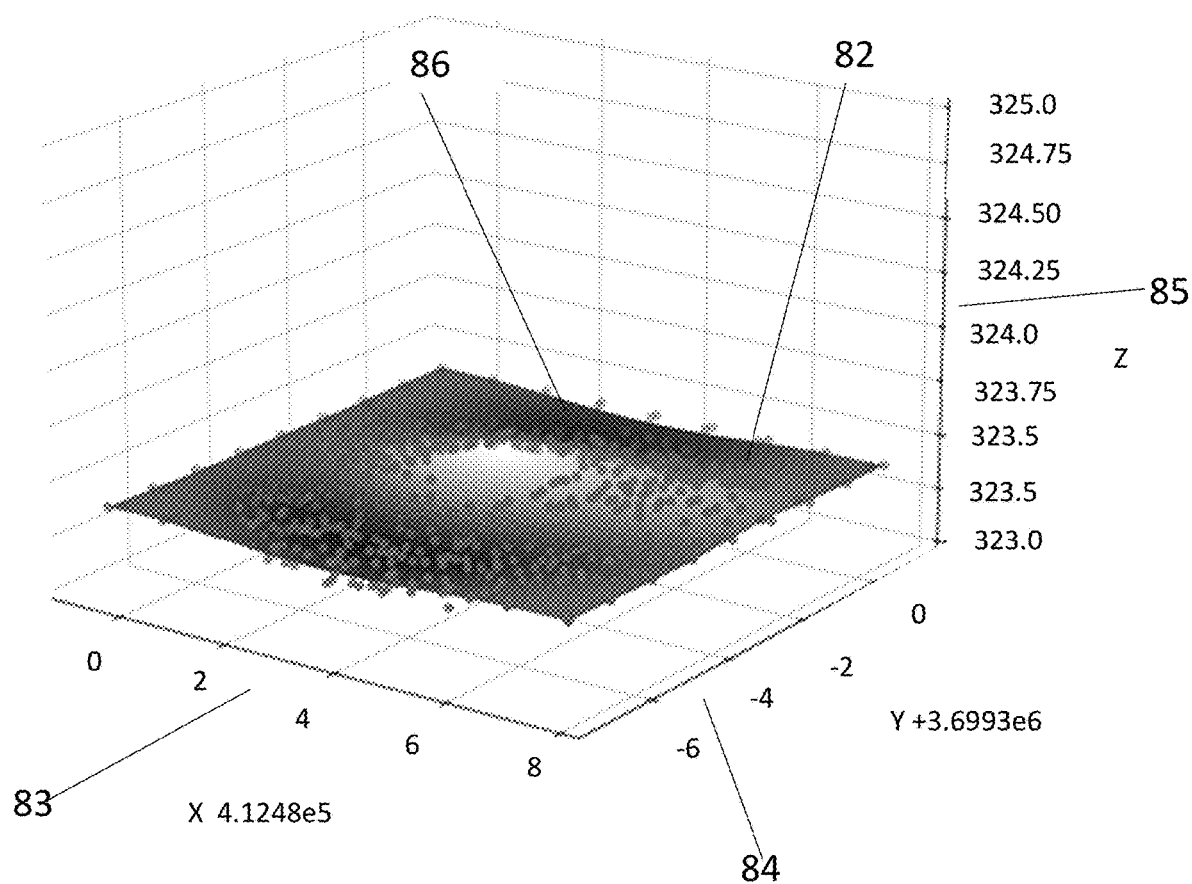
FIG. 9 shows a Multi-scale Curvature Classification surface fitting after convergence.

FIG. 9 shows a MCC surface fitting after convergence. Notice all the Buckshot points have been removed and the final thin-plate spline surface fitting the ground data 82 is fit to the remaining ground points 86. Element 83 is the X axis, element 84 is the Y axis and element 85 is the z axis.

This instant invention uses this MCC approach because the thin-plate spline surface has the desired behavior of adhering to the ground points and ignoring the spray of the Buckshot points. Finding the ground is exactly what the instant invention is trying to do in this step. As the process continues more and more Buckshot points are removed until all that remain are ground points. In the end, the final thin-plate spline surface is fit to only ground points.

With the ground surface fit the next question is if the potential Buckshot centroid is above the ground? If the answer is yes, and the other criteria are met then the instant invention has identified a valid Buckshot event.

The instant invention approach is to model and find Buckshot events in LiDAR point cloud dataset collected with Geiger-mode Avalanche Photodiode camera sensors and utilize machine learning and artificial intelligence modules to determine if a perceived abnormality in the point cloud dataset is a Buckshot event. This approach is illustrated in the flowchart shown in FIG. 10. Once a Buckshot event has been found, its location can be flagged or it can be removed automatically without manual intervention, which reduces the cost of cleaning the point cloud dataset. Removing Buckshot amounts to removing the points that define a Buckshot event from the LiDAR point cloud dataset.

Figure 10:
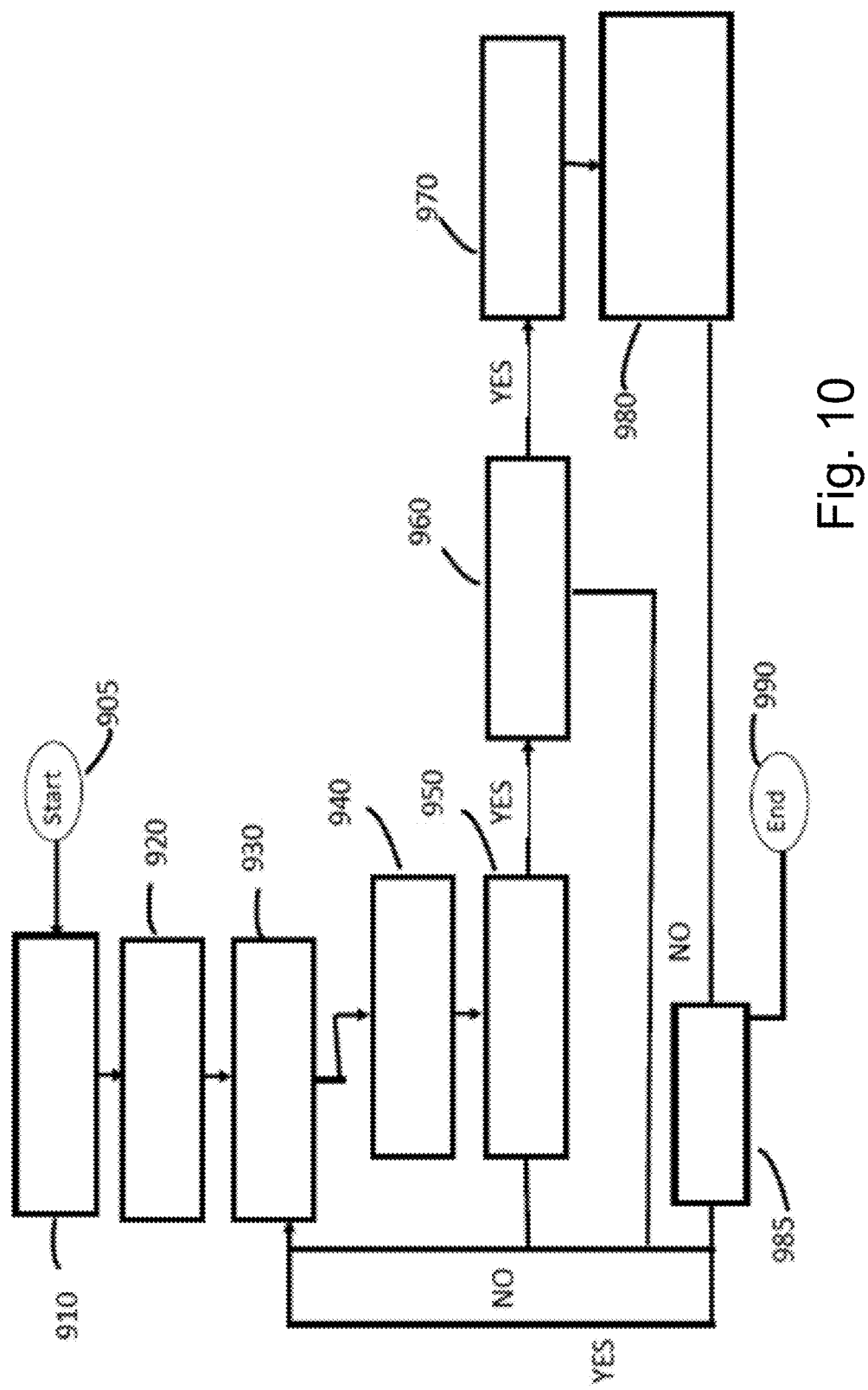
FIG. 10 shows a flowchart for finding abnormalities in the data or Buckshot events such as extraneous noise points, from the LiDAR point cloud dataset.

Referring to FIG. 10 which is a flow chart of the instant invention. The process starts at step 905. Step 910 the instant invention acquires a LiDAR point cloud file or dataset. In Step 920 the instant invention scans the file for all high intensity points. Next in step 930 the instant invention processes each high intensity point through the following process. Step 940 the instant invention identifies and finds neighboring points. Then the instant invention in step 950 utilizes a matching algorithm to determine if the neighboring points fit a 2 m, 4 m or 8 m Buckshot model. If the answer is no, then the instant invention proceeds to step 930 and begins evaluating the next high intensity point. Else, if the answer is yes then the instant invention transfers control to 960 where it determines if the centroid is on the ground based on the MCC approach. If the answer is no, the control is transferred to step 930, else the instant invention transfers control to step 970 and identifies the centroid as a valid Buckshot event. The instant invention then transfers control to step 980 which can then either record the Buckshot event location or remove the Buckshot points from the LiDAR point cloud dataset. The system then transfers control to step 930 and begins evaluating the next high intensity point until all the data in the target square has been analyzed step 985 and then pass control to step 990 where the process is terminated.

The approach uses a multi scale machine learning method to determine the best parameters for the 3 key Buckshot sizes: 2 m, 4 m, and 8 m. The models are strengthened as more manually identified Buckshot events are found and added to the machine learning set training data. During the execution of the algorithm, as potential Buckshot events are found, an MCC routine is run to determine if the Buckshot's centroid is on the ground. If they are found to be above the ground, then the Buckshot is determined to be valid.

Without removing these Buckshot noise events the LiDAR point cloud dataset are less interpretable and far harder to segment into classification categories. LiDAR classification is the dividing of the LiDAR point cloud dataset into pre-determined categories such as building, vegetation, water, etc. The task of LiDAR classification is quite common and introduces value to the data. Leaving Buckshot in the point cloud dataset makes the data harder to classify and open to misclassification. Up to this point Buckshot identification has been done manually by GIS technicians using visual techniques. This is a very labor-intensive task and is prone to error in interpretation and omission. Having an automated approach removes these issues and makes the process scalable.

Figure 11:
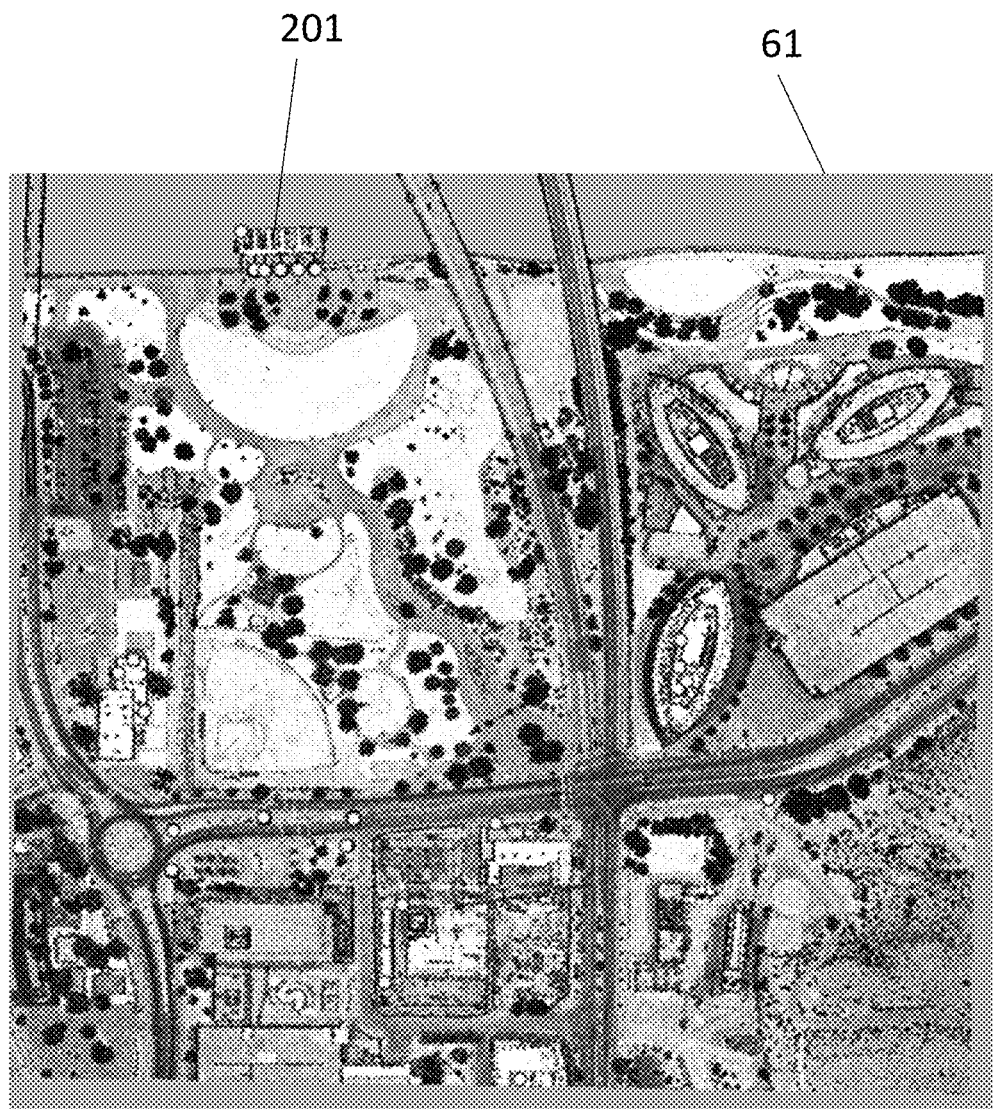
FIG. 11 shows a LiDAR point cloud dataset in a 500 m by 500 m tile rendered as intensity with the automatic Buckshot modification locations shown in white.

FIG. 11 shows the same scene shown in FIG. 6, this time with the automatically located Buckshot events 10 are overlaid in white 201.

Figure 12:
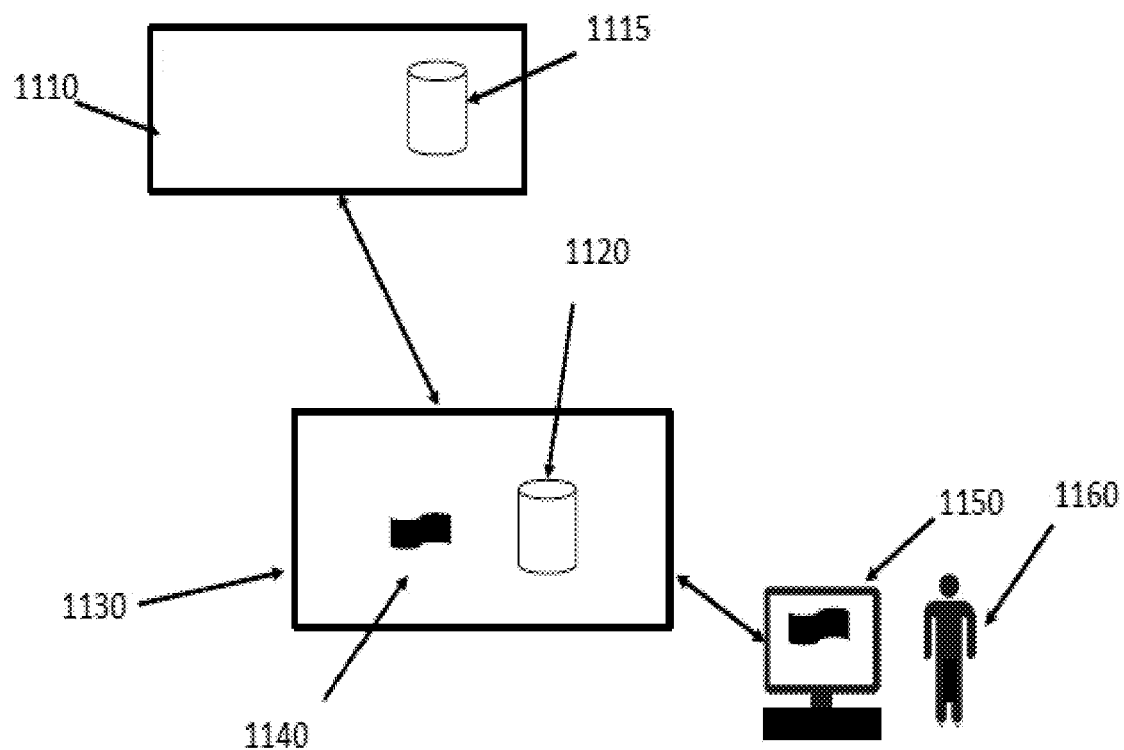
FIG. 12 shows a typical schematic of the overall system.

A general system diagram of the instant invention is shown in FIG. 12. LiDAR point cloud dataset is stored on the LiDAR point cloud server 1110 on storage device 1115. The cloud server 1130 running application 1140 and utilizing storage 1120 is in communication with the LiDAR point cloud dataset 1110 and the data display and input device 1150 which is operated by operator 1160.

In one embodiment the instant invention is a method of finding Buckshot events in LiDAR point cloud dataset collected with Geiger-mode Avalanche Photodiode camera sensors and analyzed with an algorithm and the algorithm executing the steps comprising:

a. Step 1401: Start b. Step 1405: acquiring a LiDAR point cloud dataset;

c. Step 1410: scanning the LiDAR point cloud dataset for high intensity point mass and determining a central point of the high intensity point mass and identifying it as a high intensity point selecting a Buckshot model;

d. Step 1415: identifying LiDAR points in the LiDAR point cloud dataset in close proximity to the high intensity point;

e. Step 1420: utilizing a matching algorithm to determine if the neighboring points fit the selected Buckshot model;

f. Step 1425: if the answer is no and the neighboring points do not fit the Buckshot model, then the algorithm transfers control to step 14501;

g. Step 1430: else, if the answer is yes and the neighboring points fit the Buckshot model, then the algorithm determines if the centroid is on the ground based on using a Multi-scale Curvature Classification approach;

h. Step 1435: if the centroid is not on the ground the algorithm identifies the centroid as a valid Buckshot event;

i. Step 1440: the algorithm records the Buckshot event location and removes the Buckshot points from the LiDAR point cloud dataset;

j. Step 1445: the algorithm then begins evaluating LiDAR point cloud dataset for the next high intensity point mass and determining a central point of the next high intensity point mass and identifying it as a high intensity point;

k. Step 1450: the algorithm transfers control to step d repeats steps d to j until there are no high intensity point mass remaining in the LiDAR point cloud dataset; and l. Step 1455: the algorithm identifying the ground data points in the dataset.

m. Step 1460: End

The method wherein the Buckshot model is selected from the group consisting of 2 m diameter, 4 m diameter and 8 m diameter and the algorithm is a multi-scale machine learning method.

In an alternate embodiment the instant invention is an algorithm that is a method of finding Buckshot events in LiDAR point cloud dataset and analyze the data by executing the steps comprising:

a. Step 1501: Start b. Step 1503: acquiring a LiDAR point cloud dataset;

c. Step 1505: scanning the LiDAR point cloud dataset for high intensity point masses and determining a central point of each the high intensity point masses and identifying each a central point of each the high intensity point masses as a high intensity point;

d. Step 1508: recording each instance of high intensity in a high intensity file;
e. Step 1510: selecting the first point of high intensity from the high intensity file and identifying it as high intensity location;
f. Step 1515: selecting a first buckshot model;
g. Step 1518: identifying LiDAR points in close proximity to the central point of the high intensity location;
h. Step 1520: utilizing a matching algorithm to determine if the neighboring points fit the first Buckshot model;
i. Step 1523: if the neighboring points do not fit the first Buckshot model the algorithm transfers control to step 1533
j. Step 1525: else, if the answer is yes that neighboring points fit the first Buckshot model, then the algorithm determines if the centroid is on the ground based on using a Multi-scale Curvature Classification approach
k. Step 1528: if the answer is yes that the centroid is not on the ground the algorithm identifies the centroid as a valid Buckshot event and transfers control to step 1560;
l. Step 1530: if the answer is no that the neighboring points does not fit the first Buckshot model, then the algorithm selects a second buckshot model;
m. Step 1533: utilizing a matching algorithm to determine if the neighboring points fit the second Buckshot model;
n. Step 1535: if the neighboring points do not fit the second Buckshot model the algorithm transfers control to step 1545:
o. Step 1538: else, if the answer is yes that neighboring points fit the second Buckshot model, then the algorithm determines if the centroid is on the ground based on using a Multi-scale Curvature Classification approach
p. Step 1540: if the answer is yes that the centroid is not on the ground the algorithm identifies the centroid as a valid Buckshot event and transfers control to step 1560
q. Step 1543: if the answer is no that the neighboring points do not fit the second Buckshot model, then the algorithm selects a third buckshot model;
r. Step 1545: utilizing a matching algorithm to determine if the neighboring points fit the third Buckshot model;
s. Step 1548: if the neighboring points do not fit the third Buckshot model the algorithm transfers control to step 1568:
t. Step 1550: else, if the answer is yes that neighboring points fit the third Buckshot model, then the algorithm determines if the centroid is on the ground based on using a Multi-scale Curvature Classification approach;
u. Step 1553: if the answer is yes that the centroid is not on the ground the algorithm identifies the centroid as a valid Buckshot event and transfers control to step 1560;
v. Step 1555: if the answer is no that the neighboring points does not fit the third Buckshot model, then the algorithm transfers control to 1563;
w. Step 1558: the algorithm records the Buckshot event location or removes the Buckshot points from the LiDAR point cloud dataset;
x. Step 1560: The instant invention records that the high intensity point is not a Buckshot point;
y. Step 1563: selecting the next point of high intensity from the high intensity file and identifying it as high intensity location;
z. Step 1565: the algorithm transfers control to step 1515;
aa. Step 1568: the algorithm repeats until there are no high intensity points remaining in the high intensity file; and
bb. Step 1570: the algorithm identifying the ground data points.
cc. Step 1575: Stop The algorithm can further be defined as a multi-scale machine learning method where the first Buckshot mode has a 2 m diameter model, the second Buckshot mode has a 4 m diameter and third Buckshot mode has an 8 m diameter.

In some embodiments, the system, method or methods described above may be executed or carried out by a computing system including a tangible computer-readable storage medium, also described herein as a storage machine, that holds machine-readable instructions executable by a logic machine such as a processor or programmable control device to provide, implement, perform, and/or enact the above described methods, processes and/or tasks. When such methods and processes are implemented, the state of the storage machine may be changed to hold different data. For example, the storage machine may include memory devices such as various hard disk drives, CD, flash drives, cloud storage, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, game controllers, video camera, camera, keyboard or gaming controller. For example, a user input may indicate a request that a certain task is to be executed by the computing system, such as requesting the computing system to display any of the above-described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Since many modifications, variations, and changes in detail can be made to the described embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

In addition, the present invention has been described with reference to embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further it is intended that any other embodiments of the present invention that result from any changes in application or method of use or operation, method of manufacture, shape, size, or materials which are not specified within the detailed written description or illustrations contained herein are considered within the scope of the present invention.

As far as the description above and the accompanying drawings disclose any additional subject matter that is not within the scope of the claims below, the inventions are not dedicated to the public and the right to file one or more applications to claim such additional inventions is reserved.

Although very narrow claims are presented herein, it should be recognized the scope of this invention is much broader than presented by the claim. It is intended that broader claims will be submitted in an application that claims the benefit of priority from this application.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of finding Buckshot events in LiDAR point cloud dataset collected with Geiger-mode Avalanche Photodiode camera sensors and analyzed with an algorithm, the method comprising:
    acquiring a LiDAR point cloud dataset, comprising:
        emitting laser light towards a ground surface; and
        receiving, with a Geiger-mode Avalanche Photodiode camera sensor, reflected portions of the emitted laser light;
    at a computing system, generating a sanitized point cloud dataset from the LiDAR point cloud dataset, the generating comprising:
        a. providing the LiDAR point cloud dataset as input to a model that is configured to accept the LiDAR point cloud dataset as an input and provide the sanitized point cloud dataset as output, the model configured to perform operations including:
        b. scanning the LiDAR point cloud dataset for high intensity point mass and determining a central point of said high intensity point mass and identifying it as a high intensity point;
        c. selecting a Buckshot model;
        d. identifying neighboring LiDAR points in said LiDAR point cloud dataset in close proximity to said high intensity point;
        e. utilizing a matching algorithm to determine if the neighboring LiDAR points fit said selected Buckshot model;
        f. if the matching algorithm determines that the neighboring LiDAR points do not fit said Buckshot model, transferring control to step k;
        g. else, if the matching algorithm determines that the neighboring LiDAR points fit said Buckshot model, determining if the high intensity point is on the ground surface based on using a Multi-scale Curvature Classification approach;
        h. if the high intensity point is not on the ground surface, identifying the high intensity point as a valid Buckshot event;
        i. recording a location of the valid Buckshot event and removing the neighboring LiDAR points from the LiDAR point cloud dataset;
        j. evaluating the LiDAR point cloud dataset for a next high intensity point mass and determining a next central point of said next high intensity point mass and identifying it as a next high intensity point; and
        k. repeating steps c to j until there is no high intensity point mass remaining in said LiDAR point cloud dataset;
        l. in response to determining that there is no high intensity point mass remaining in said LiDAR point cloud dataset, generating the sanitized point cloud dataset, the sanitized point cloud dataset omitting each respective high intensity point identified as a respective valid Buckshot event and each respective neighboring LiDAR point associated with the respective valid Buckshot event; and
    at the computing system, rendering, on a display, a tile corresponding to a topographical representation of the ground surface, the rendering including:
        rendering LiDAR points of the sanitized point cloud dataset as intensity; and
        overlaying, in the tile, a respective visual identifier at each respective recorded valid Buckshot event location.

2. The method of claim 1, wherein said Buckshot model is selected from the group consisting of a 2 meter diameter model, a 4 meter diameter model, and an 8 meter diameter model.

3. The method of claim 1, wherein said algorithm is a multi-scale machine learning method.

4. The method of claim 1, wherein overlaying a respective visual identifier at each respective recorded Buckshot event location comprises overlaying a respective graphical dot at each respective recorded Buckshot event location.

5. A method of finding Buckshot events in LiDAR point cloud dataset and analyzed with an algorithm, the method comprising:
    acquiring a LiDAR point cloud dataset, comprising:
        emitting laser light towards a ground surface; and
        receiving, with a Geiger-mode Avalanche Photodiode camera sensor, reflected portions of the emitted laser light;
    at a computing system, generating a sanitized point cloud dataset from the LiDAR point cloud dataset, the generating comprising:
        a. providing the LiDAR point cloud dataset as input to a model that is configured to accept the LiDAR point cloud dataset as an input and provide the sanitized point cloud dataset as output, the model configured to perform operations including:
        b. scanning the LiDAR point cloud dataset for high intensity point masses and determining a respective central point of each respective high intensity point mass and identifying a respective central point of each respective high intensity point mass as a high intensity point;
        c. recording each high intensity point in a high intensity file;
        d. selecting a high intensity point from said high intensity file;
        e. selecting a first Buckshot model;

f. identifying neighboring LiDAR points in close proximity to the high intensity point;
g. utilizing a matching algorithm to determine if the neighboring LiDAR points fit said first Buckshot model;
h. if the neighboring LiDAR points do not fit said first Buckshot model, transferring control to step k;
i. else, if the neighboring LiDAR points fit said first Buckshot model, determining if the high intensity point is on the ground surface using a Multi-scale Curvature Classification approach;
j. if the high intensity point is not on the ground surface, identifying the high intensity point as a valid Buckshot event and transferring control to step u;
k. if the neighboring LiDAR points do not fit said first Buckshot model, selecting a second Buckshot model;
l. utilizing the matching algorithm to determine if the neighboring LiDAR points fit said second Buckshot model;
m. if the neighboring LiDAR points do not fit said second Buckshot model, transferring control to step p;
n. else, if the neighboring LiDAR points fit said second Buckshot model, determining if the high intensity point is on the ground surface using a Multi-scale Curvature Classification approach;
o. if the high intensity point is not on the ground surface, identifying the high intensity point as a valid Buckshot event and transferring control to step u;
p. if the neighboring LiDAR points do not fit said second Buckshot model, selecting a third Buckshot model;
q. utilizing the matching algorithm to determine if the neighboring LiDAR points fit said third Buckshot model;
r. if the neighboring LiDAR points do not fit said third Buckshot model, transferring control to step v;
s. else, if the neighboring LiDAR points fit said third Buckshot model, determining if the high intensity point is on the ground surface using a Multi-scale Curvature Classification approach;
t. if the high intensity point is not on the ground surface, identifying the high intensity point as a valid Buckshot event and transferring control to step u;
u. in response to identifying the high intensity point as a valid Buckshot event, recording a location of the valid Buckshot event and removing the high intensity point and the neighboring LiDAR points from the LiDAR point cloud dataset;
v. in response to identifying that the neighboring LiDAR points do not fit any of the first, second, or third Buckshot models, recording that the high intensity point does not correspond to a Buckshot event;
w. repeating steps d through w until there are no high intensity points remaining in said high intensity file; and
x. in response to determining that there is no high intensity point mass remaining in said high intensity file, generating the sanitized point cloud dataset, the sanitized point cloud dataset omitting each respective high intensity point identified as a respective valid Buckshot event and each respective neighboring LiDAR point associated with the respective valid Buckshot event; and at the computing system, rendering, on a display, a tile corresponding to a topographical representation of the ground surface, the rendering including:
  rendering LiDAR points of the sanitized point cloud dataset as intensity; and
  overlaying, in the tile, a respective visual identifier at each respective recorded valid Buckshot event location.

6. The method of claim 5, wherein said first Buckshot model is a 2 meter diameter model.

7. The method of claim 6, wherein said second Buckshot model is a 4 meter diameter model.

8. The method of claim 7, wherein said third Buckshot mode is an 8 meter diameter model.

9. The method of claim 5, wherein said algorithm is a multi-scale machine learning method.

10. The method of claim 5, wherein overlaying a respective visual identifier at each respective recorded valid Buckshot event location comprises overlaying a respective graphical dot at each respective recorded valid Buckshot event location.

11. A computer system comprising:
a display;
one or more processors;
memory; and
one or more programs stored in the memory and configured to be executed by the one or more processors and including instructions for:
  receiving a LiDAR point cloud dataset collected with a Geiger-mode Avalanche Photodiode camera sensor;
  generating a sanitized point cloud dataset from the LiDAR point cloud dataset, the generating comprising:
    a. providing the LiDAR point cloud dataset as input to a model that is configured to accept the LiDAR point cloud dataset as an input and provide the sanitized point cloud dataset as output, the model configured to perform operations including:
    b. scanning the LiDAR point cloud dataset for high intensity point mass and determining a central point of said high intensity point mass and identifying it as a high intensity point;
    c. selecting a Buckshot model;
    d. identifying neighboring LiDAR points in said LiDAR point cloud dataset in close proximity to said high intensity point;
    e. utilizing a matching algorithm to determine if the neighboring LiDAR points fit said selected Buckshot model;
    f. if the matching algorithm determines that the neighboring LiDAR points do not fit said Buckshot model, transferring control to step k;
    g. else, if the matching algorithm determines that the neighboring LiDAR points fit said Buckshot model, determining if the high intensity point is on a ground surface based on using a Multi-scale Curvature Classification approach;
    h. if the high intensity point is not on the ground surface, identifying the high intensity point as a valid Buckshot event;
    i. recording a location of the valid Buckshot event and removing the neighboring LiDAR points from the LiDAR point cloud dataset;

j. evaluating the LiDAR point cloud dataset for a next high intensity point mass and determining a next central point of said next high intensity point mass and identifying it as a next high intensity point; and k. repeating steps c to j until there is no high intensity point mass remaining in said LiDAR point cloud dataset;

l. in response to determining that there is no high intensity point mass remaining in said LiDAR point cloud dataset, generating the sanitized point cloud dataset, the sanitized point cloud dataset omitting each respective high intensity point identified as a respective valid Buckshot event and each respective neighboring LiDAR point associated with the respective valid Buckshot event; and rendering, on the display, a tile corresponding to a topographical representation of the ground surface, the rendering including:
rendering LiDAR points of the sanitized point cloud dataset as intensity; and
overlaying, in the tile, a respective visual identifier at each respective recorded valid Buckshot event location.

12. The computer system of claim 11, wherein said Buckshot model is selected from the group consisting of a 2 meter diameter model, a 4 meter diameter model, and an 8 meter diameter model.

13. The computer system of claim 11, wherein overlaying a respective visual identifier at each respective recorded Buckshot event location comprises overlaying a respective graphical dot at each respective recorded Buckshot event location.

* * * * *